No. 615,594. Patented Dec. 6, 1898.
S. M. VAUCLAIN.
ELECTRIC LOCOMOTIVE AND TRUCK.
(Application filed Dec. 29, 1897.)
(No Model.)
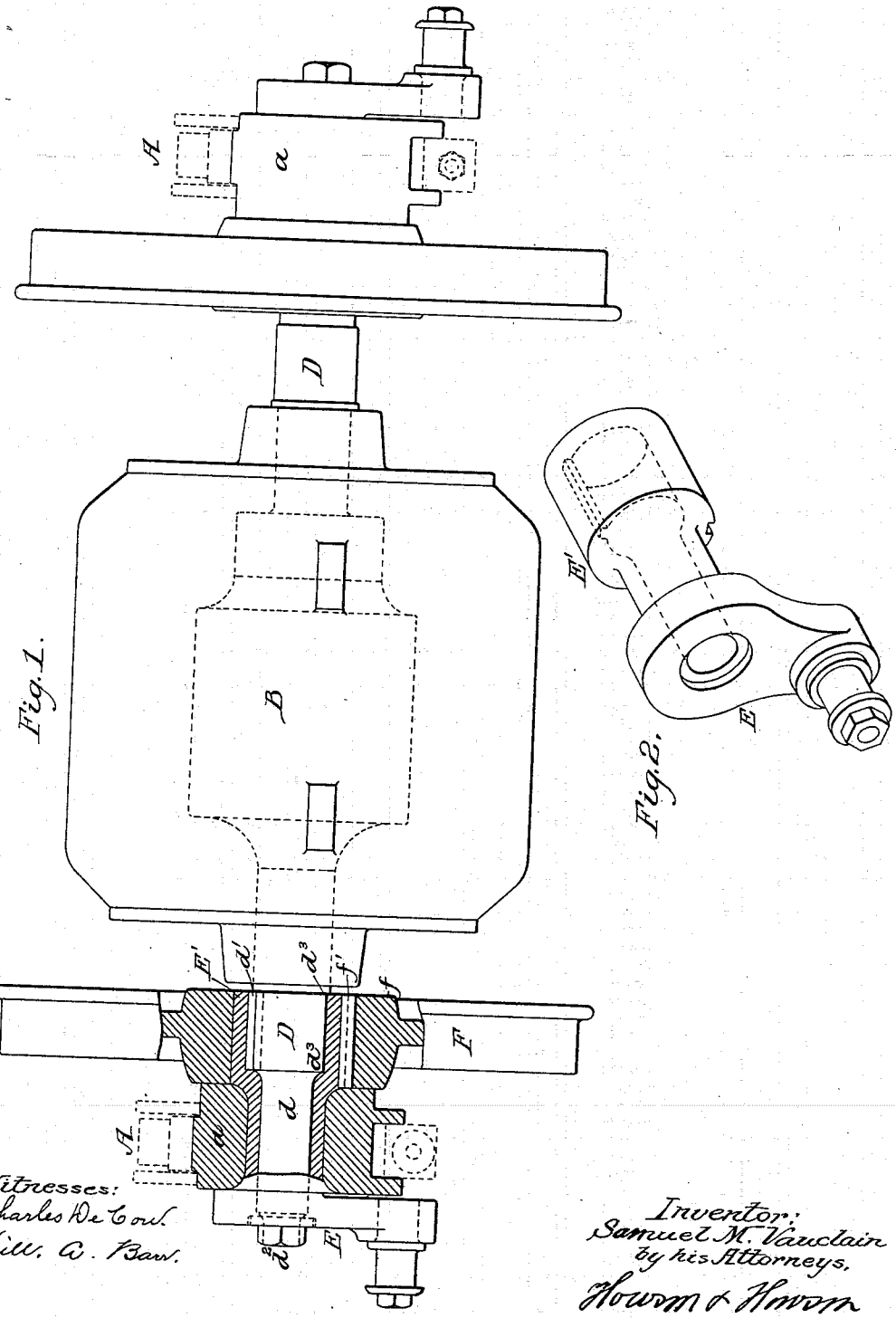
Witnesses:
Charles De Cou.
Will. A. Barr.
Inventor:
Samuel M. Vauclain
by his Attorneys,
Howson & Howson

UNITED STATES PATENT OFFICE.

SAMUEL M. VAUCLAIN, OF PHILADELPHIA, PENNSYLVANIA.

ELECTRIC LOCOMOTIVE AND TRUCK.

SPECIFICATION forming part of Letters Patent No. 615,594, dated December 6, 1898.

Application filed December 29, 1897. Serial No. 664,302. (No model.)

*To all whom it may concern:*

Be it known that I, SAMUEL M. VAUCLAIN, a citizen of the United States, residing in Philadelphia, Pennsylvania, have invented certain Improvements in Electric Locomotives and Trucks, of which the following is a specification.

The object of my invention is to so construct the driving mechanism of a locomotive or motor-car truck that the driving-wheels, with their cranks, can be readily removed from the driving shaft or axle when repairs or alterations are necessary.

In the accompanying drawings, Figure 1 is an end view, partly in section, of an electric motor-truck, illustrating my invention; and Fig. 2 is a detached perspective view of one of the cranks.

I have shown the frame A of the truck in dotted lines and the boxes $a\ a$ in full lines.

B is the motor.

D is the driving shaft or axle, on which is the armature shown by dotted lines. As shown in Fig. 1, this shaft D is reduced in the present instance at each end at $d$, and adapted to the shaft is a journal or sleeve $E'$, forming part of a crank E, Fig. 2. This journal extends through the bearing $a$ and through the hub $f$ of the driving-wheel F, to which it is fixed. The hub is increased in diameter for the reception of the journal $E'$. The journal or sleeve of the crank is securely fixed to the hub of the wheel F by being forced into the hub and secured against turning therein by a key $f'$. Each journal or sleeve is detachably secured to the driving shaft or axle D by a key $d'$ and a nut $d^2$, so that on detaching the nut the sleeve, with the wheel attached, can be removed. In the present instance each end of the shaft is screw-threaded, and adapted to the threads are nuts $d^2$, which, with the shoulders $d^3$, confine the sleeves longitudinally on the shaft. Other fastenings may be used without departing from my invention. The shaft D is thus rigidly connected to the wheels F through the cranks, and after the shaft, wheels, and cranks are removed from the truck one or both cranks, with their wheels, may be withdrawn from the shaft by simply removing one or both nuts $d^2$, thus allowing free access to the motor, and, if necessary, to allow for the withdrawal of the axle from the motor.

It will be understood that the frame can be constructed in any suitable manner and any form of motor can be used, and this motor can be hung as desired.

I claim as my invention—

1. The combination in a locomotive or truck, of a shaft, a crank thereon having an extended sleeve, and a driving-wheel secured to the sleeve, substantially as described.

2. The combination in an electric locomotive, of the driving-shaft, a crank thereon having an extended sleeve, a wheel secured to the sleeve of the crank, and a bearing-block in which the sleeve is journaled, substantially as described.

3. The combination in an electric locomotive or truck, of the motor-shaft, a crank having an extended sleeve, secured to said motor-shaft, a wheel secured to the said sleeve, and a bearing-block mounted between the crank and the wheel, substantially as described.

4. The combination in an electric motor or truck, of the frame, bearing-blocks thereon, a motor, a motor-shaft carrying the armature of the motor, said shaft being reduced at each end, a crank adapted to each end of the said shaft and keyed thereto, the ends of the shaft being threaded, nuts thereon confining the cranks to the shaft, the sleeves of said cranks extending through the boxes, wheels mounted on the sleeves, substantially as described.

In testimony whereof I have signed my name to this specification in the presence of two subscribing witnesses.

SAMUEL M. VAUCLAIN.

Witnesses:
JAMES G. KEYS,
JAS. H. M. HAYES.